US010113708B1

(12) United States Patent
Tress

(10) Patent No.: US 10,113,708 B1
(45) Date of Patent: Oct. 30, 2018

(54) EDGE LIGHTED PANEL

(71) Applicant: Rev-A-Shelf Company, LLC, Louisville, KY (US)

(72) Inventor: Christopher Michael Tress, Louisville, KY (US)

(73) Assignee: REV-A-SHELF COMPANY, LLC, Louisville, KY (US)

( * ) Notice: Subject to any disclaimer, the term of this patent is extended or adjusted under 35 U.S.C. 154(b) by 0 days.

(21) Appl. No.: 15/582,431

(22) Filed: Apr. 28, 2017

(51) Int. Cl.

| | |
|---|---|
| *F21V 3/02* | (2006.01) |
| *F21V 17/10* | (2006.01) |
| *F21V 29/89* | (2015.01) |
| *F21V 23/00* | (2015.01) |
| *F21V 19/00* | (2006.01) |
| *F21Y 115/10* | (2016.01) |
| *F21Y 105/16* | (2016.01) |

(52) U.S. Cl.
CPC .............. *F21V 3/02* (2013.01); *F21V 17/101* (2013.01); *F21V 19/003* (2013.01); *F21V 23/001* (2013.01); *F21V 29/89* (2015.01); *F21Y 2105/16* (2016.08); *F21Y 2115/10* (2016.08)

(58) Field of Classification Search
CPC .... G02B 6/0013; G02B 6/0015; G02B 6/016; G02B 6/002; G02B 6/0021
USPC .................. 362/612, 613, 621, 622
See application file for complete search history.

(56) References Cited

U.S. PATENT DOCUMENTS

| | | | |
|---|---|---|---|
| 4,625,266 A | 11/1986 | Winter | |
| 5,829,864 A | 11/1998 | Scanlan | |
| 6,932,495 B2 | 8/2005 | Sloan et al. | |
| 7,131,746 B2 | 11/2006 | Cook | |
| 7,473,022 B2 | 1/2009 | Yoo | |
| 7,738,053 B2 * | 6/2010 | Kubota | G02B 6/0055 349/65 |
| 7,744,252 B2 | 6/2010 | Maxik | |
| 7,766,502 B2 | 8/2010 | Tress | |
| 7,954,973 B1 | 6/2011 | Holland et al. | |
| 7,954,979 B2 | 6/2011 | Sommers et al. | |
| 8,147,114 B2 | 4/2012 | Lin et al. | |
| 8,511,879 B2 * | 8/2013 | Im | G02B 6/0091 349/65 |
| 8,545,049 B2 | 10/2013 | Davis et al. | |
| 8,696,183 B2 * | 4/2014 | Huang | G02B 6/0033 362/608 |
| 9,103,959 B2 * | 8/2015 | Jeong | G02B 6/003 |
| 9,207,389 B2 | 12/2015 | Moon et al. | |
| 9,678,265 B2 * | 6/2017 | Zhang | G02B 6/0021 |
| 2002/0093832 A1 | 7/2002 | Hamilton | |
| 2004/0062031 A1 | 4/2004 | Pinter | |
| 2005/0270774 A1 | 12/2005 | Pan | |

(Continued)

*Primary Examiner* — Laura Tso
(74) *Attorney, Agent, or Firm* — Brinks Gilson & Lione

(57) ABSTRACT

A panel lighting system includes a translucent panel formed to include a channel in a boundary wall of the translucent panel. A flexible circuit board may be mounted on the boundary wall such that LEDs mounted sequentially on the flexible circuit board extend into the channel. The LEDs may be fixedly maintained in the channel by the flexible circuit board being adhesively coupled with the boundary wall adjacent the channel. The system may also include an edge connector coupled to the boundary wall. The edge connector may be a corner edge connector or a side edge connector configured to fixedly hold a coupler that couples and provides strain relief for a cable.

16 Claims, 9 Drawing Sheets

(56) References Cited

U.S. PATENT DOCUMENTS

| | | |
|---|---|---|
| 2007/0081339 A1 | 4/2007 | Chung et al. |
| 2007/0127261 A1* | 6/2007 | An .................... G02B 6/0016 362/608 |
| 2009/0073692 A1 | 3/2009 | Berger et al. |
| 2011/0075413 A1 | 3/2011 | Smith et al. |
| 2011/0167690 A1 | 7/2011 | Bjarnason et al. |
| 2012/0026751 A1* | 2/2012 | Lin .................... G02B 6/0021 362/611 |
| 2014/0313774 A1 | 10/2014 | Myers et al. |

\* cited by examiner

EDGE LIGHTED PANEL

TECHNICAL FIELD

This disclosure relates to panel lighting systems and more specifically to an edge lighted panel.

BACKGROUND

Lighting fixtures may be used for utility lighting or for decorative lighting. Such lighting fixtures may be mounted on walls or ceilings, mounted on poles or pedestals, or mounted in or upon items, such as furniture. Such lighting fixtures may be powered by AC or DC power and include one or more light sources such as an incandescent light source, a florescent light source or a light emitting diode (LED) light source. Light emitted by such light fixtures may be direct or indirect.

Considerations for installation of lighting fixtures include heat dissipation, visual effect and manufacturability. Such considerations are typically more significant in non-traditional or specialty lighting installations, interior lighting installations, and installations that require minimized clearances, fixture sizes and/or specialized materials. Lighting installation designs that satisfy all of these considerations are typically specialized configurations requiring significant creativity and engineering.

SUMMARY

An example of a panel lighting system includes a planar translucent panel formed to include a channel extending along a periphery of the planar translucent panel between a top edge and a bottom edge of the planar translucent panel. The system also includes a flexible circuit board comprising a plurality of light emitting diodes (LEDs) sequentially mounted on a front planar surface of the circuit board, and an adhesive strip mounted on the front planar surface of the circuit board adjacent the LEDs. The planar translucent panel comprising a first ledge extending away from the top edge and a second ledge extending away from the bottom edge such that the first ledge and the second ledge cooperatively define the channel, and the circuit board is adhered to at least one of the first ledge and the second ledge by the adhesive strip to maintain the LEDs extended into the channel.

Another example of a panel lighting system includes a flexible circuit board comprising a plurality of light emitting diodes (LEDs), and a translucent panel comprising a boundary wall surrounding a top planar surface and a bottom planar surface of the translucent panel. At least part of the boundary wall including a channel formed between a top peripheral edge of the top planar surface and a bottom peripheral edge of the bottom planar surface. The system also includes a flexible bonding strip disposed between the flexible circuit board and the boundary wall and configured to fixedly bond the flexible circuit board to the translucent panel such that the LEDs extend into the channel and the flexible circuit board extends between the top peripheral edge and the bottom peripheral edge.

Yet another example of a panel lighting system that includes means for surface mounting and providing electric power to a series of light emitting diodes (LEDs) comprising a first surface upon which the LEDs are mounted. The system also includes means for displaying objects comprising a first planar surface opposing a second planar surface and a peripheral edge surrounding the first planar surface and the second planar surface. The peripheral edge formed to include a channel extending between the first planar surface and the second planar surface into the means for displaying objects. The system also includes means for dissipating heat coupled with a second surface of the means for surface mounting, the second surface being opposite the first surface upon which the LEDs are mounted. The system further includes means for coupling the first surface of the means for surface mounting to an outer surface of the peripheral edge such that the means for coupling extends along the peripheral edge and the first surface is perpendicular with both the top planar surface and the bottom planar surface.

Additional interesting features of the panel lighting system include an edge connector coupled along a straight side or a corner of the panel. The edge connector is aligned with a notch in the boundary wall to provide a space for electrically coupling wires to the flexible circuit board. The connector also includes a coupler to provide strain relief to a cable supplying signal and/or power to the flexible circuit board.

Another interesting feature of the panel lighting system is that the circuit board is flexible so as to be adhesively coupled to the contours of the peripheral edge of the lighting panel.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
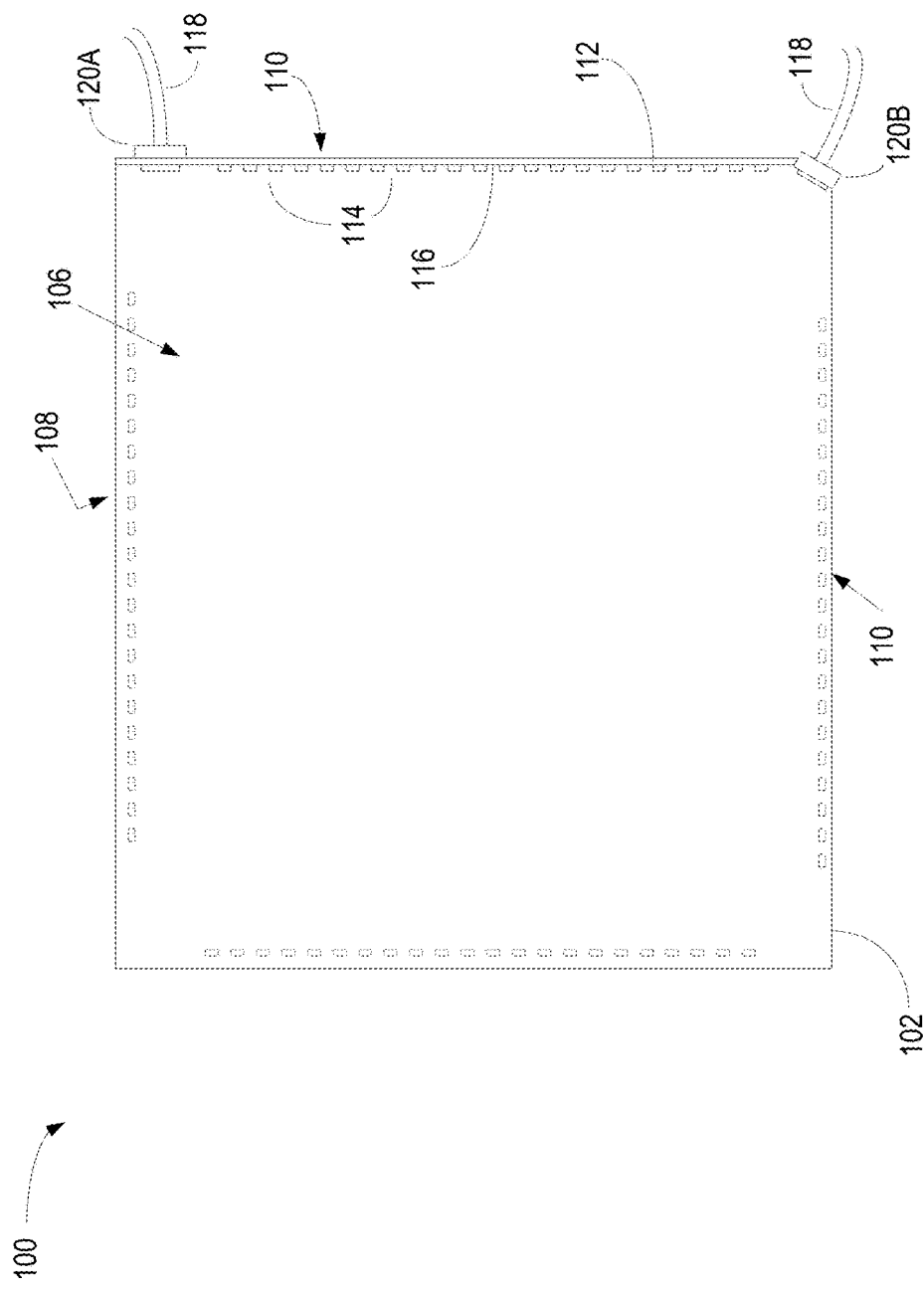
FIG. 1 shows a top view of an example of a panel lighting system.

FIG. 1 illustrates a top view of an example of a panel lighting system 100 that includes a panel 102. The panel 102 may be a planar structure formed of a translucent rigid material such as plastic or acrylic having a top planar surface 106, a bottom planar surface 108, and a peripheral edge 110. The panel 102 may be a planar translucent panel with a surrounding boundary wall. One or more of the peripheral edges 110 of the panel 102 may be formed to receive a flexible circuit board 112 that includes light emitting diodes (LEDs) 114 sequentially mounted on a front planar surface 116 of the circuit board 112.

The flexible circuit board 112 may include a printed circuit to provide signal paths for power and/or signals, including supply of power to the LEDs 114. The circuit board 112 may be a flexible circuit board, such as in the form of circuit tape, to allow the circuit board 112 to be molded or formed to a contour of the boundary wall defining the periphery of the panel 102.

The LEDs 114 may be electrically coupled with circuit board 112 so as to receive power from the circuit board 112 and emit light energy. The LEDs 114 may be any size and/or shape that can be accommodated on the circuit board 112 in a sequentially spaced order to form at least one row along the length of the circuit board 112. The LEDs 114 may also be sized and shaped to fit within a channel formed in the panel 102.

The panel 102 may also be formed to receive a cable 118. The cable may be a power and/or signal transmission device to supply one or more control signals and/or power to the circuit board 112. The cable 118 may be coupled with the panel 102 by an edge connector 120 illustrated as 120A or 120B. The edge connector 120 may be a side edge connector, identified as 120A in FIG. 1, which is coupled along a straight edge of the peripheral edge 110. Alternatively, the edge connector 120 may be a corner edge connector, identified as 120B in FIG. 1. The edge connector 120 may include a coupler to provide strain relief, couple the cable 118 to the panel, and prevent damage to the cable 118. The coupler may be coupled with the panel 102 by a bracket.

Although the LEDs 114 are positioned along only one peripheral edge 110 of the panel 102 in the example of FIG. 1, in other examples, the LEDs 114 may be positioned along one or more other locations along the peripheral edge 110 as illustrated by dotted outline in FIG. 1. Moreover, although the panel 102 is illustrated as generally square in the example of FIG. 1, in other examples the panel 102 may be circular, rectangular, oval, or any other shape having a top planar surface 106, a bottom planar surface 108 and a peripheral edge 110.

During operation, upon energization, light waves emitted by the LEDs 114 may propagate through the translucent panel 102 creating the visual effect of light emitting as a generally uniform glow from substantially the entirety of the planar surfaces 106 and 108. Although the LEDs 114 are mounted at the peripheral edge 110, due to the panel 102 being translucent, and the LEDs 114 being positioned along the peripheral edge 110 to extend into the panel 102, the light may propagate from near the peripheral edge 110 where the circuit board 112 is positioned through the panel 102 to the other peripheral edges 110.

Figure 2:
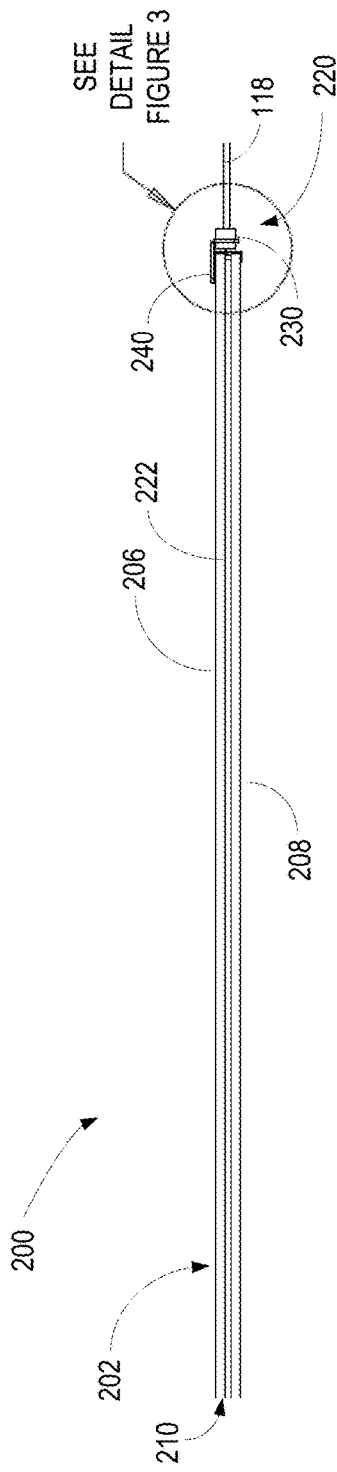
FIG. 2 illustrates a side view of an example panel lighting system similar to the system of FIG. 1.

FIG. 2 is a side view of an example panel lighting system 200 similar to the panel lighting system 100 illustrated in FIG. 1. Accordingly, the discussion and functionality related to the system of FIG. 1 is applicable to the example of FIG. 2, and the discussion and functionality of the system of FIG. 2 is applicable to the example of FIG. 1, unless otherwise indicated. The panel lighting system 200 includes a panel 202 having a top planar surface 206, a bottom planar surface 208, and a boundary wall 210 surrounding the top planar surface 206 and the bottom planar surface 208. The boundary wall 210 may be formed to define a channel 222 or groove. A cable 118 may be coupled with the boundary wall 210 via an edge connector 220 so as to provide signal and/or power to the panel lighting system 200. The edge connector 220 includes a coupler 230 and a bracket 240. In FIG. 2, the edge connector 220 is illustrated as a side edge connector that extends along and in parallel with the boundary wall 210.

Figure 3:
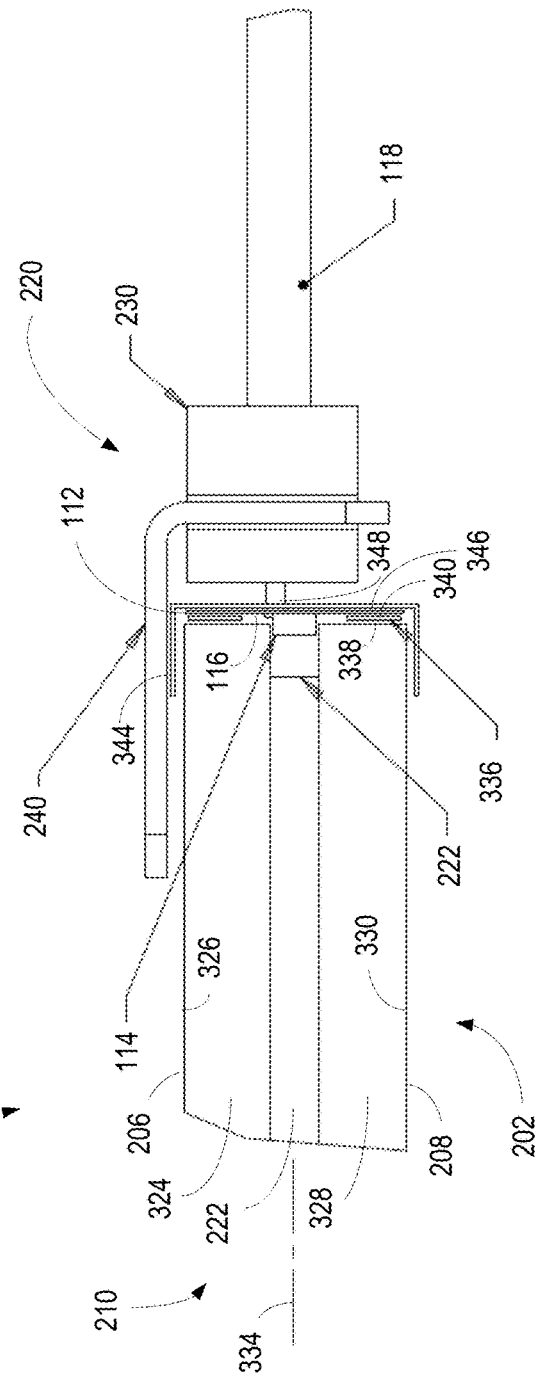
FIG. 3 illustrates a detailed view of a portion of the example panel lighting system of FIG. 2, which includes an edge connector.

FIG. 3 is a detailed view of a portion of the panel lighting system 200 of FIG. 2, which includes the edge connector 220. In FIG. 3, the panel 202 is illustrated as including a top ledge (or first ledge) 324 extending from a top peripheral edge 326 where the top planar surface 206 and the boundary wall 210 perpendicularly intersect, and a bottom ledge (or second ledge) 328 extending from a bottom peripheral edge 330 where the bottom planar surface 208 and the boundary wall 210 perpendicularly intersect, such that the first ledge 324 and the second ledge 328 define the channel 222 therebetween. In other words, the distance between the first ledge 324 and the second ledge 326 define the width of channel 222, or groove. The channel 222 extends into the panel 202 parallel with the top planar surface 206 and the bottom planar surface 208 to accommodate the LEDs 114. In examples, a central axis of the channel 222 and a central axis of the panel are the same central axis 334 such that the channel 222 is substantially equidistant from the top planar surface 206 and the bottom planar surface 208.

The LEDs 114 are mounted on the front planar surface 116 of the circuit board 112. The circuit board 112 is positioned such that only the LEDs 114 extend into the channel 222 and portions of the front planar surface 116 of the circuit board 112 adjacent the LEDs 114 abut and contact the top ledge 324 and the bottom ledge 328. In other examples the circuit board 112 may only extend from one side of the channel to abut either the top ledge 324 or the bottom ledge 328.

An adhesive strip, or flexible bonding strip, 336 is mounted on the portions of the front planar surface 116 that abuts the top ledge 324 and/or the bottom ledge 328. The bonding strip 336 may be positioned on the front planar surface 116 to extend along adjacent to the row of LEDs 114. The bonding strip 336 includes a first adhesive surface 338 and a second adhesive surface 340. The first adhesive surface 338 and the second adhesive surface 340 are positioned on opposing surfaces of the bonding strip 336 such that the first adhesive surface 338 couples the bonding strip 336 to the panel 202 and the second adhesive surface 340 couples the bonding strip 336 to the circuit board 112 such that the circuit board 112 is coupled with the panel 202. In examples, the circuit board 112 may be positioned such that only the row of LEDs 114 extend into the channel 222, and the circuit board extends between the top peripheral edge 206 and the bottom peripheral edge 208 of the panel 202. The width of the circuit board 112 extending between the top peripheral edge 206 and the bottom peripheral edge 208 may be less than or equal to the width of the panel 202

A heat dissipation layer 344 is positioned in contact with a rear planar surface 346 of the circuit board 112. The heat dissipation layer 344 may be any flexible material, such as aluminum capable of dissipating heat generated from the circuit board 112 and/or LEDs 114. The heat dissipation layer 344 may be adhesively coupled with the rear planar surface 346 of the circuit board 112, and may extend beyond the rear planar surface 346 to also engage the top planar surface 206 and the bottom planar surface 208 as illustrated in FIG. 3, or may extend to the edges of the circuit board 112. In examples, the aluminum layer 344 may be adhesively coupled with both the rear planar surface 346 and the panel 202, only the rear planar surface 346, or only the panel 202.

The edge connector 220 may also be coupled with the panel 202 by the bracket 240 which holds the coupler 230 in position next to the circuit board 112. The cable 118 extends through the coupler 230 and is fixedly held therein. Wires 348 included in the cable 118 to provide power and/or signals may extend out of the coupler 230 and be terminated on the circuit board 112 by, for example, solder or mechanical connections. In FIG. 3, the edge connector 220 is illustrated as a side edge connector coupled with the top planar surface 206 of the panel 202 via the bracket 240. In other examples, the edge connector 220 may be a corner edge connector.

Figure 4:
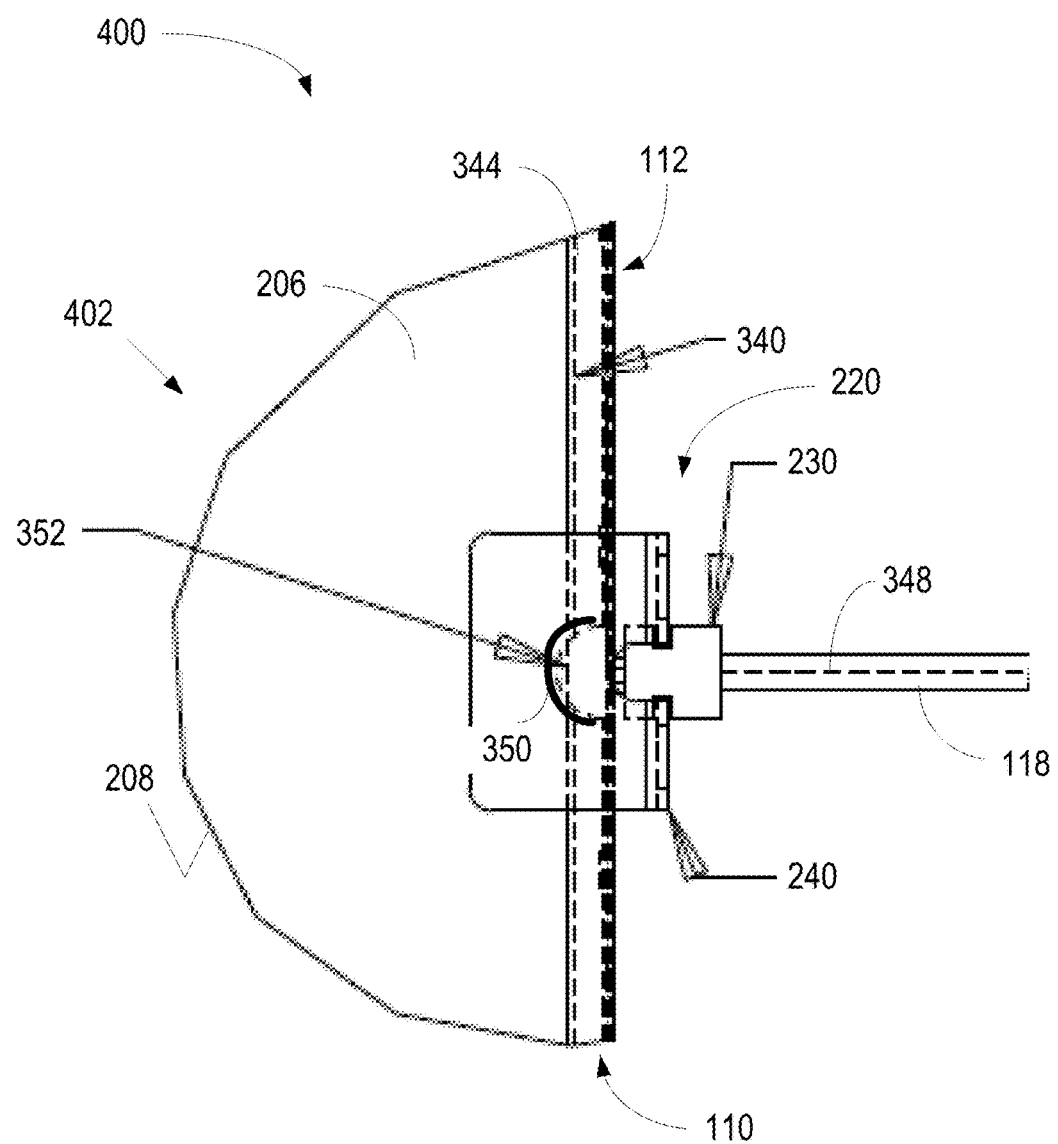
FIG. 4 illustrates a top view of an example of a portion of a panel lighting system.

FIG. 4 illustrates a top view of an example of a portion of a panel lighting system 400 similar to the systems of FIGS. 1-3. Accordingly, the discussion and functionality related to the systems of FIGS. 1, 2 and 3 is applicable to the example of FIG. 4, and the discussion and functionality of the system of FIG. 4 is applicable to the examples of FIGS. 1-3, unless otherwise indicated. A portion of the panel 402 of the illustrated panel lighting system 400 is coupled with the edge connector 220, which is a side edge connector similar to FIG. 3. The illustrated edge connector 220 is coupled at the edge of the panel 202 along a straight portion of the boundary wall 110.

The edge connector 220 includes the coupler 230 to provide strain relief for the cable 118 and the bracket 240 to which the coupler 230 is fixedly connected. The bracket 240 is coupled with top planar surface 206 of the panel 402, and is formed to include an opening 350 aligned with a notch 352 in the panel 402 in order to accommodate termination of the wires 348 on the circuit board 112. The edge connector 220 is therefore coupled with the top planar surface 206 or the bottom planar surface 208 so as to align with the notch 352. The notch 352 may provide a termination cavity where the wires 348 may be terminated on the circuit board 112. In examples, the wires 348 may be power wires in a power cable, which may be terminated on the circuit board 112 by soldering the wires 348 to power connections, or pads, on the circuit board 112 that are positioned in the notch 352. In other examples, terminals, lugs, wire nuts, or other connection mechanisms may be present in the notch 352 to couple the wires to the circuit board 112.

The notch 352 may be formed by a portion of the boundary wall 110 in a predetermined shape, such as a semi-circle as illustrated in FIG. 4. In other examples, the notch 352 may be square, oval, rectangular or any other shape. The notch 352 may be formed in the top ledge 324 or the bottom ledge 328 (FIG. 3). Thus, the notch 352 may extend from the top planar surface 206 to the channel 222, or from the bottom planar surface 208 to the channel 222. Alternatively, the notch 352 may be formed in both the top ledge 324 and the bottom ledge 328 so as to extend from the top planar surface 206 through the channel 222 to the bottom planar surface 208. The notch 352 is sized to receive at least part of the coupler 230, and to allow for access to the wires 348 in order to complete the coupling of the wires 348 to the circuit board 112. The bracket 240 may fixedly maintain at least a portion of the coupler 230 in the notch 352 such that the wires 348 are also coupled to the circuit board 112 in the notch 352.

In FIG. 4, the heat dissipation layer 344 is wrapped around the boundary wall 210 so as to cover a portion of the top planar surface 206, the opening 350 and the notch 352. In addition, the heat dissipation layer 344 may be wrapped around the boundary wall 202 so as to cover the circuit board 112, the heat dissipation layer 344, and a portion of the bottom planar surface 208 as illustrated by dotted lines in FIG. 4. Also illustrated by dotted lines in FIG. 4 is the bonding strip 336 positioned between the circuit board 112 and the boundary wall 110, and the circuit board 112 positioned between the bonding strip 336 and the heat dissipation layer 344.

In examples, there may be a holding layer (not shown) over the heat dissipation layer 344. In examples, the holding layer may be an adhesive tape or other similar material that can rigidly maintain the position of the circuit board 112 with respect to the panel 202. Advantageously, due to the close coupling and the use of the bonding strip 336, the holding layer, and the heat dissipation layer 344, the amount of extension of the heat dissipation layer 344 or the holding layer on the top planar surface 206 and/or the bottom planar surface 208 may be minimized thereby providing a larger uncovered surface area of the panel 202 from which light may be emitted. In addition, because only the LEDs 114 are inserted into the channel 222, the shadows formed in the panel 202 between the energized LEDs 114 are minimized providing a more brightly and uniformly lit panel 202.

Figure 5:
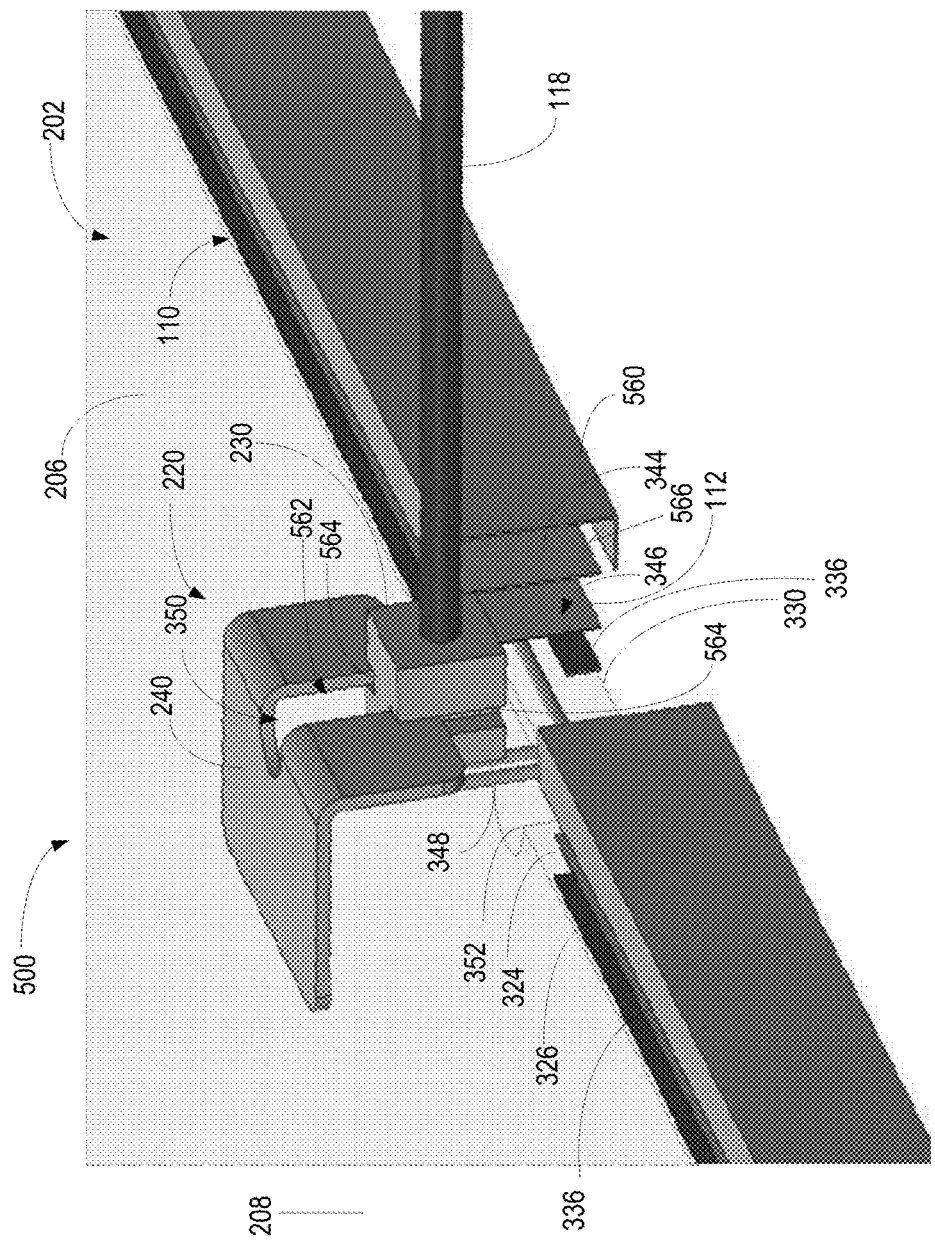
FIG. 5 is an exploded perspective view of a portion of a panel lighting system.

FIG. 5 is an exploded perspective view of a portion of a panel lighting system 500 similar to the systems of FIGS. 1-4 that includes a panel 206. Accordingly, the discussion and functionality related to the systems of FIGS. 1, 2, 3 and 4 is applicable to the example of FIG. 5, and the discussion and functionality of the system of FIG. 5 is applicable to the examples of FIGS. 1-4, unless otherwise indicated. In addition to the opening 350, the bracket 240 is also formed to include a slot 562 to receive the coupler 230 such that ducts 564 formed on opposite sides of the coupler 230 receive opposite edges of the bracket 240 forming the slot 562.

In FIG. 5, bonding strips 336 are disposed on the flexible circuit board 112 so as to couple the top ledge 324 and the bottom ledge 328 of the boundary wall 110 to the circuit board 112. In addition, the heat dissipation layer 344 is coupled to the rear planar surface 346 of the circuit board 112 and extends to the top peripheral edge 326 and to the bottom peripheral edge 330 without covering a portion of the top planar surface 206 and/or the bottom planar surface 208. Thus, a width of the heat dissipation layer 344 may be of about the same or lesser than the width of the panel 202.

A cover layer 560 is also illustrated in FIG. 5. The cover layer 560 may be tape or other material that includes an adhesive layer 566 on the side of the cover layer 560 contacting the heat dissipation layer 344. Thus, the cover layer 560 adhesively couples the cover layer 560 with the heat dissipation layer 344. In addition, since the cover layer 560 is wider than the width of the panel 202, the cover layer 560 covers the entire boundary wall and extends a short distance onto the top and bottom planar surfaces of the panel 202, and is adhesively coupled thereto. The edge connector 220 of FIG. 5 is also illustrated as a side edge connector, however, in other examples edge connector 220 may be corner edge connector.

Figure 6:
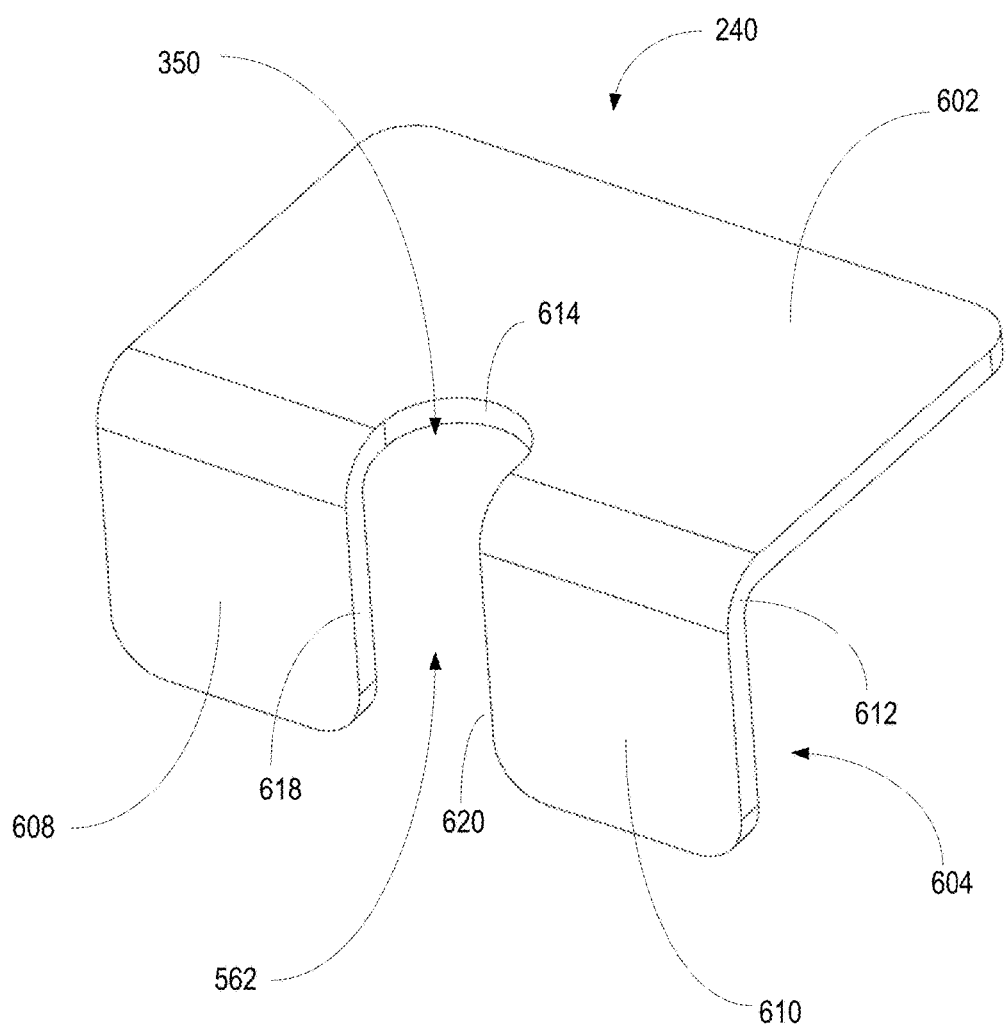
FIG. 6 is a perspective view of an example of an edge connector similar to those illustrated in FIGS. 1-5.

FIG. 6 is a perspective view of an example of a bracket 240 included in the edge connector 220 illustrated, for example, in FIG. 5. The bracket 240 may be formed as a single unitary structure that may include a plate member 602 and a keeper 604. The plate member 602 is formed as a planar surface to align in parallel with one of the top planar surface or the bottom planar surface of the panel. The keeper 604 includes a first ear 608 and a second ear 610 formed as independent fingers in the same plane. The keeper 604 lies in a plane which is transverse to the plane in which the plate member 602 lies, and the plate member 602 and the keeper 604 are rigidly coupled by a transition 612. In FIG. 6, the transition 612 is in the form of a ninety degree arcuate shaped flange or elbow that transitions between the plate member 602 and the keeper 604. In other examples, other forms of transitions 612 are possible.

The opening 350 is formed by a wall 614 in the plate member 602. The wall 612 may be perpendicular to the planar surfaces of the plate member 602. In the illustrated example, the wall 612 is arcuate, however, in other examples, the opening 350 may be defined by the wall 612 being formed in other shapes, such as a rectangle, a triangle, an oval and the like. The opening 350 transitions via the transition 612 to the slot 562. The slot 562 may be defined by respective peripheral edges 618 and 620 of the first and second ears 608 and 610. The slot 562 may be sized to receive the coupler 230 such that the passages 564 of the coupler 230 (FIG. 5) friction fit the peripheral edges 618 and 620.

Figure 7:
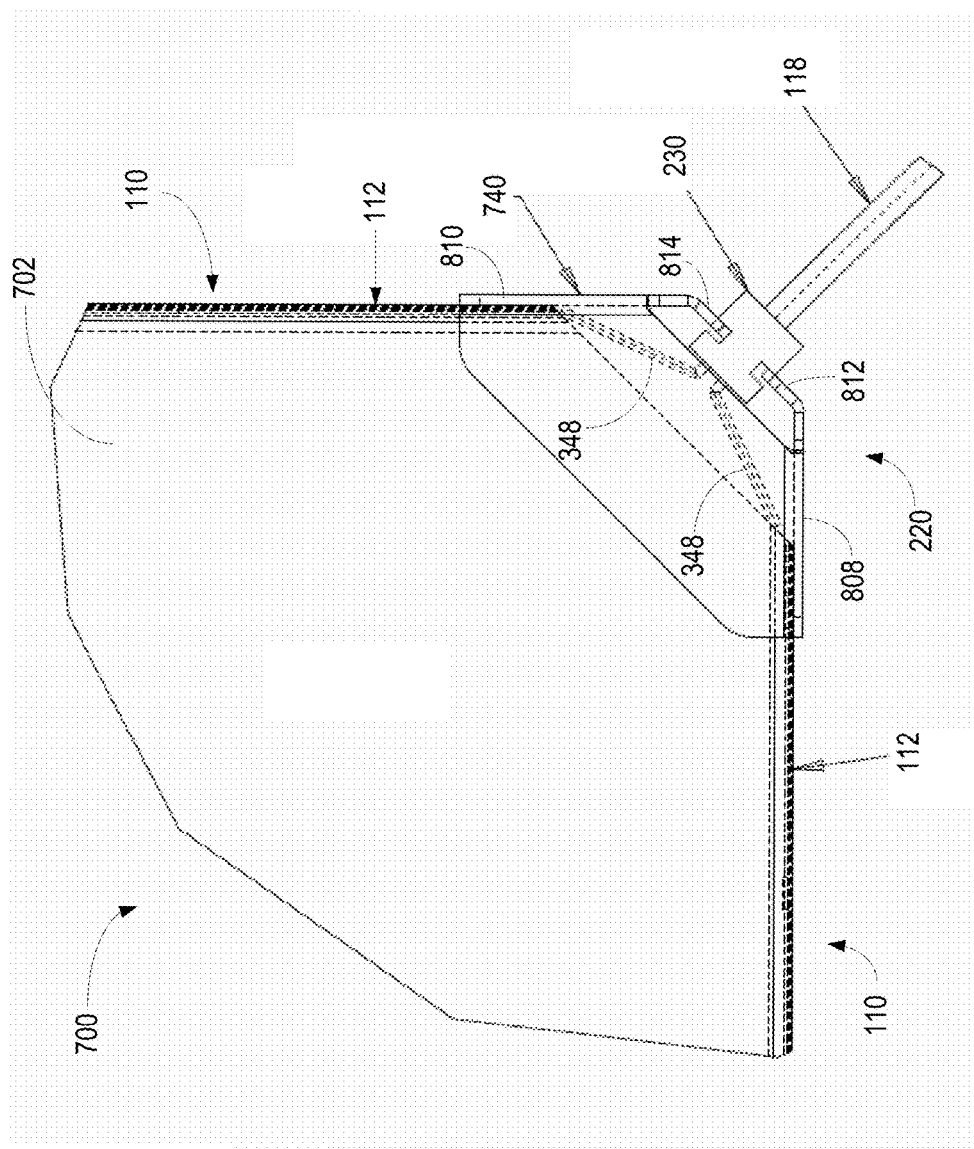
FIG. 7 illustrates a top view of an example of a portion of a panel lighting system.

FIG. 7 illustrates a top view of an example of a portion of a panel lighting system 700 similar to the systems of FIGS. 1-6. Accordingly, the discussion and functionality related to the systems of FIGS. 1, 2, 3, 4, 5 and 6 is applicable to the example of FIG. 7, and the discussion and functionality of the system of FIG. 7 is applicable to the examples of FIGS. 1-6, unless otherwise indicated. A portion of the panel 702 of the illustrated panel lighting system 700 is coupled with the edge connector 220, which is a corner edge connector. The illustrated edge connector 220 is coupled at a corner of the boundary wall 110 formed by the boundary wall being in two different intersecting transverse planes.

Figure 8:
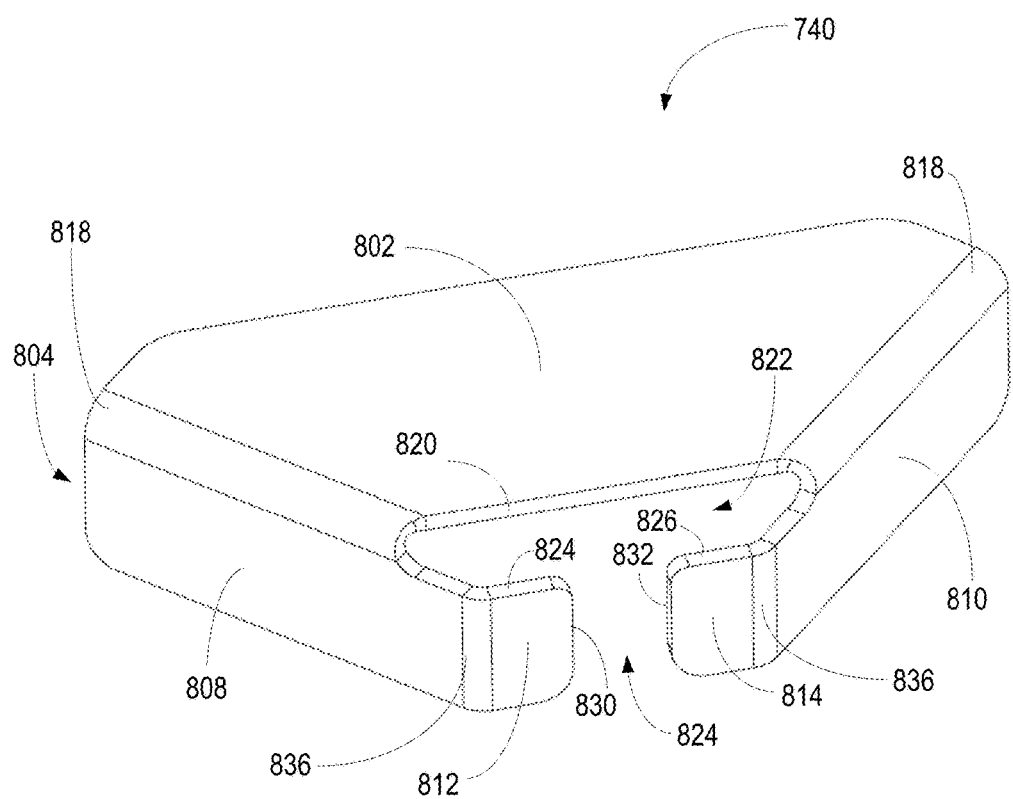
FIG. 8 is a perspective view of an example of an edge connector similar to that illustrated in FIG. 1.

FIG. 8 is a perspective view of an example of a bracket 740 included in the edge connector 220 of FIG. 7. The bracket 740 may be formed as a single unitary structure that may include a plate member 802 and a keeper 804. The plate member 802 is formed as a planar surface to align in parallel with one of the top planar surface or the bottom planar surface of the panel. The keeper 804 includes a first wall 808, and a second wall 810 each formed to align with a different boundary wall 110 at a corner of the panel. The keeper 804 includes a first ear 812 and a second ear 814 formed as independent fingers extending away from the respective first wall 808 and second wall 810. The first wall 808 and the second wall 810 lie in separate planes, which is transverse to the plane in which the plate member 802 lies. In addition, planes in which the first wall 808 and second wall 810 reside are transverse to one another. Each of the first wall 808 and second wall 810 are independently and rigidly coupled with the plate member 802 by a transition 818. In FIG. 8, the transition 818 is in the form of a ninety degree arcuate shaped flange or elbow that transitions between the plate member 802 and the keeper 804.

The bracket 740 also includes an opening 822, which is formed by the combination of a peripheral edge 820 of the plate member 802 and a top peripheral edge 824 and 826 of the first ear 812 and the second ear 814, respectively. The peripheral edge 820 of the plate member 802 may be maintained perpendicular to the planar surfaces of the plate member 802, whereas the top peripheral edge 824 and 826 may be maintained perpendicular to the first ear 812 and the second ear 814. In the illustrated example, the combination of the peripheral edge 820 of the plate member 802 and the top peripheral edge 824 and 826 of the first ear 812 and the second ear 814 form an aperture, which is generally a trapezoidal shape, however, in other examples, the opening 822 defined by the peripheral edge 820 and the top peripheral edge 824 and 826 of the first ear 812 and the second ear 814 may represent other shapes, such as a rectangle, a triangle, a circle, an oval, and the like. The opening 822 transitions via the transition 818 to the slot 824. The slot 824 may be defined by respective distal peripheral edges 830 and 832 of the first and second ears 812 and 814. The slot 824 may be sized to receive the coupler 230 such that the passages 562 of the coupler 230 (FIG. 5) friction fit the peripheral edges 830 and 832.

The first ear 812 and the second ear 814 are formed as unitary extensions of the first and second walls 808 and 810, respectively. The first ear 812 and the second ear 814 are angled at a predetermined angle through a vertical transition 836 so as to form the slot 824 with an appropriate width to friction fit the coupler 230 as illustrated in FIG. 7. Accordingly, the coupler 230 is position at the corner of the panel lighting system 700.

Referring again to FIG. 7, the cable 118 may extend into the coupler 230 and the wires 348 may exit the coupler 230 and be electrically connected with the circuit board 112 positioned along the boundary walls 110. Access to the electrical connection of the wires 348 and the circuit boards 112 extending along the boundary wall in respective channels in the two different intersecting transverse planes may be via the opening 822 (FIG. 8) formed in the edge connector 220. Similar to the other discussed examples, the circuit boards 112 may adhesively coupled to the boundary wall 110 such that the LEDs extend into channel. In the example of FIG. 7, with reference to FIG. 5, the circuit boards 112 are installed along channels on both of the illustrated boundary walls 110, with the heat dissipation layer 344 positioned in contact with and between the rear planar surface 344 of the circuit board 112, and heat dissipation layer 344, and the heat dissipation layer 344 is in contact with the cover layer 560.

The boundary walls 110 are aligned in parallel with the first and second walls 808 and 810 and may be coupled thereto by a coupling mechanism such as an adhesive. In addition, the plate member 802 may be aligned in parallel with a top or bottom planar surface of the panel 702.

Figure 9:
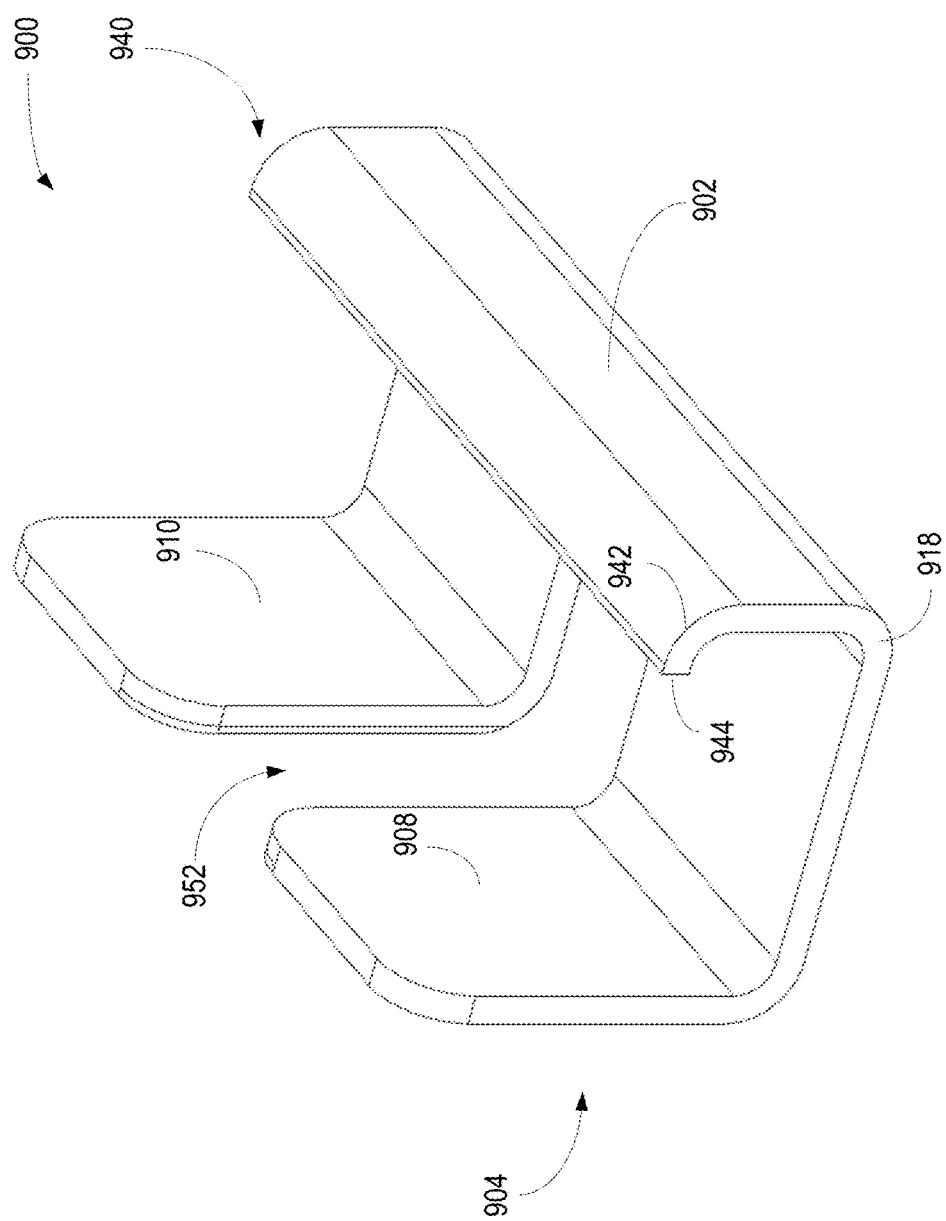
FIG. 9 is perspective view of another example of an edge connector.

FIG. 9 is a perspective view of another example of a bracket 900, which may be included as part of the edge connector 220 illustrated, for example, in FIGS. 3-6. The bracket 900 may be similar to the bracket 240 discussed with reference to FIGS. 2-5, and may be formed for edge mounting along a straight portion of the boundary wall. Accordingly, for reasons of brevity, the discussion herein will mainly focus on differences. The bracket 900 may be formed as a single unitary structure that may include a plate member 902 and a keeper 904. The plate member 902 is formed as a planar surface similar to the plate member 202 of FIG. 2, however, a distal end of the plate member 902 is formed to include a lip 940. The lip 940 may be transverse to the plate member 902 and may be formed by a radial bend 942 in the bracket 900 near a peripheral edge 944. In other examples, the lip 940 may be formed by other kinds of bends.

Similar to the edge connector 220, the keeper 904 includes an opening 952, a first ear 908 and a second ear 910 formed as independent fingers in the same plane to define a slot 962. A transition 918 from the plate member 902 to the keeper 904 may be an arcuate shaped flange or elbow have a similar radius bend to the radial bend 942.

Figure 10:
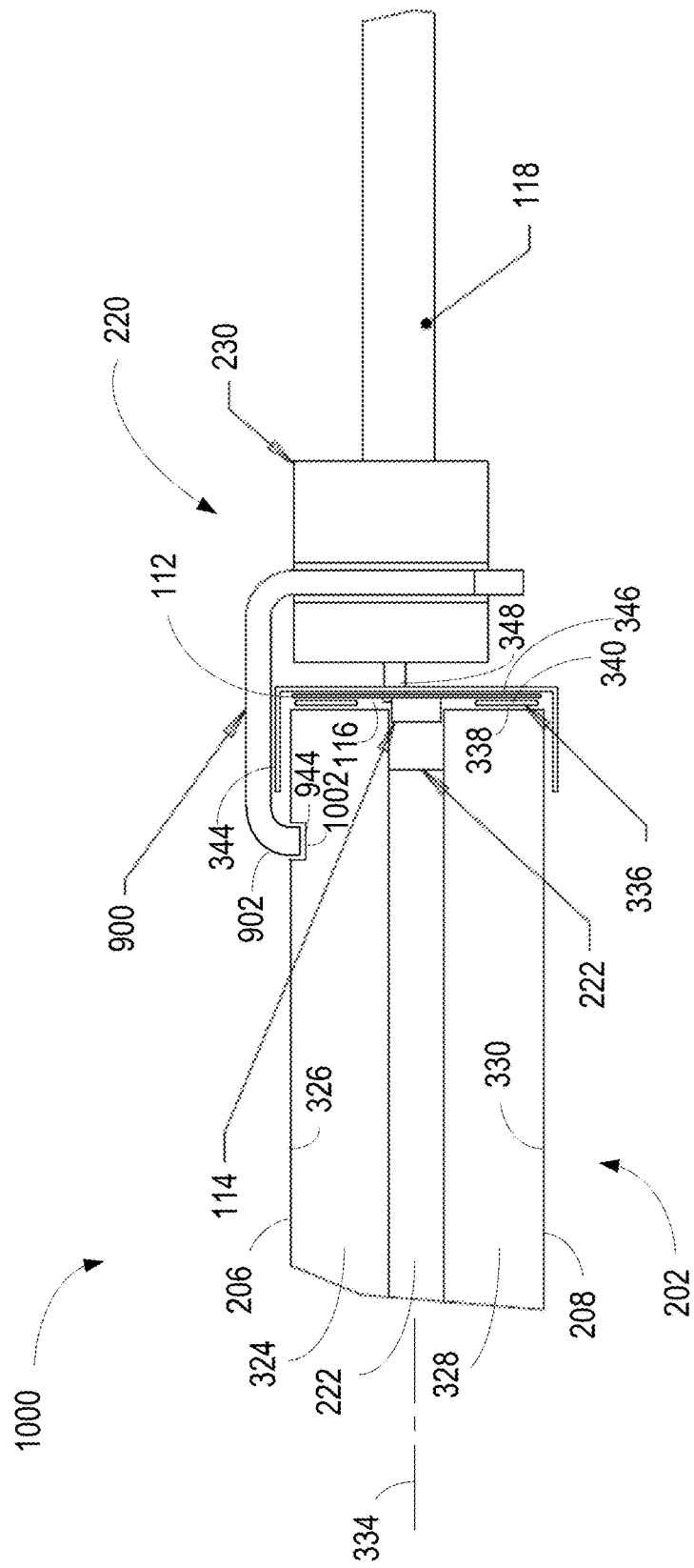
FIG. 10 illustrates a side view of another example panel lighting system similar to the system of FIG. 2 that includes the edge connector illustrated in FIG. 9.

FIG. 10 illustrates a side view of an example panel lighting system 1000 similar to the system of FIG. 2. The panel lighting system 1000 may be similar to the previously discussed panel lighting systems, thus, for reasons of brevity, the discussion herein will mainly focus on differences. In FIG. 10, the bracket 900, illustrated in FIG. 9, is included as part of the edge connector 220.

The panel 202 of FIG. 10 may include a slot 1002 in the top planar surface 206 which is positioned and sized to receive the lip 940 when the bracket 900 is positioned on the panel 202 such that the peripheral edge 944 is adjacent the bottom of the slot. The slot 1002 may extend along the top planar surface 206 parallel to, and a predetermined distance from, the peripheral edge of the panel 202. The slot 1002 may be formed in the location the bracket 1000 will be positioned, or may extend beyond the location, or may be in multiple locations on the panel 202.

The lip 940 may engage the slot 1002 in the panel 202. For example, the lip 940 may form a snap fit or a friction fit with the slot 1002 in the upper surface 206 such that the bracket 1000 is coupled with the panel 202. This may be in addition or an alternative to the adhesion provided by the cover later 560 (FIG. 5). In other examples, the slot 1002 may be in the bottom planar surface 208 and the lip 940 of the bracket 1000 may be on the bottom side so as to correspondingly engage the slot 1002 formed in the bottom planar surface 208. In still other examples, there may be top and bottom plate surfaces on the bracket 900 with respective lips 902. In this example, both the top and bottom planar surfaces 206 and 208 of the panel 202 may include slots 1002 formed to receive respective lips 940 such that the bracket 1002 is clamped to the top and bottom planar surfaces 206 and 208.

Various implementations have been specifically described. However, many other implementations are also possible.

I claim:

1. A panel lighting system comprising:
a planar translucent panel formed to include a channel extending along a periphery of the planar translucent panel between a top edge and a bottom edge of the planar translucent panel;
a flexible circuit board comprising a plurality of light emitting diodes (LEDs) sequentially mounted on a front planar surface of the circuit board;
an adhesive strip mounted on the front planar surface of the circuit board adjacent the LEDs, wherein the adhesive strip comprises a first adhesive layer and a second adhesive layer, the first adhesive layer and the second adhesive layer being mounted on opposing surfaces of the adhesive strip, the first adhesive layer coupling the adhesive strip to the planar translucent panel and the second adhesive layer coupling the adhesive strip to the flexible circuit board; and
a flexible heat conducting material coupled to a rear planar surface of the flexible circuit board to provide heat dissipation for the flexible circuit board;
wherein the planar translucent panel comprising a first ledge extending away from the top edge and a second ledge extending away from the bottom edge such that the first ledge and the second ledge cooperatively define the channel, and the circuit board is adhered to at least one of the first ledge and the second ledge by the adhesive strip to maintain the LEDs extended into the channel.

2. The panel lighting system of claim 1, wherein the adhesive strip and the circuit board are flexible so as to follow a contour of a boundary wall defining the periphery of the planar translucent panel.

3. The panel lighting system of claim 1, wherein the LEDs are mounted on the circuit board to extend a predetermined distance into the channel such that part of the front planar surface of the circuit board abuts the first ledge and the second ledge.

4. The panel lighting system of claim 1, wherein a central axis of the channel is also a central axis of the planar translucent panel.

5. A panel lighting system comprising:
a flexible circuit board comprising a plurality of light emitting diodes (LEDs);
a translucent panel comprising a boundary wall surrounding a top planar surface and a bottom planar surface of the translucent panel, at least part of the boundary wall including a channel formed between a top peripheral edge of the top planar surface and a bottom peripheral edge of the bottom planar surface, wherein the translucent panel is formed to define a notch, the notch configured to receive at least part of a coupler and provide a termination cavity where a power cable coupled with the coupler is terminated on the flexible circuit board; and
a flexible bonding strip disposed between the flexible circuit board and the boundary wall and configured to fixedly bond the flexible circuit board to the translucent panel such that the LEDs extend into the channel and the flexible circuit board extends between the top peripheral edge and the bottom peripheral edge.

6. The panel lighting system of claim 5, wherein only the LEDs are disposed in the channel.

7. The panel lighting system of claim 5, wherein the flexible bonding strip comprises an adhesive layer on opposing surfaces.

8. The panel lighting system of claim 5, further comprising an edge connector coupled to the boundary wall at the notch and coupled with the coupler.

9. The panel lighting system of claim 8, wherein the edge connector is fixedly coupled with the top planar surface or the bottom planar surface in alignment with the notch.

10. The panel lighting system of claim 8, wherein the edge connector is a side edge connector coupled along a straight portion of the boundary wall.

11. The panel lighting system of claim 8, wherein the edge connector is a corner edge connector coupled at a corner of the boundary wall formed by the boundary wall being in two different intersecting transverse planes.

12. The panel lighting system of claim 5, wherein the LEDs are sequentially mounted on a surface of the flexible circuit board extending along a length of the flexible circuit board, and the flexible bonding strip comprises a first flexible bonding strip adhesively coupled to a portion of the surface adjacent the LEDs and to a portion of the boundary wall between at least one of the top peripheral edge or the bottom peripheral edge and the channel.

13. A panel lighting system comprising:
means for surface mounting and providing electric power to a series of light emitting diodes (LEDs) comprising a first surface upon which the LEDs are mounted;
means for displaying objects comprising a first planar surface opposing a second planar surface and a peripheral edge surrounding the first planar surface and the second planar surface, the peripheral edge formed to include a channel extending between the first planar surface and the second planar surface into the means for displaying objects;
means for dissipating heat coupled with a second surface of the means for surface mounting, the second surface being opposite first surface upon which the LEDs are mounted; and
means for coupling the first surface of the means for surface mounting to an outer surface of the peripheral edge such that the means for coupling extends along the peripheral edge and the first surface is perpendicular with both the top planar surface and the bottom planar surface; and means for fixedly holding a coupler at the peripheral edge by being coupled with at least one of the first planar surface or the second planar surface, the means for fixedly holding the coupler being a single unitary structure that includes a plate member in a first plane and a keeper in a second plane perpendicular to the plate member, the plate member coupled with, and positioned in parallel with, one of the first planar surface or the second planar surface, the keeper configured to engage the coupler, and the coupler configured to receive and provide strain relief for a power cord.

14. The system of claim 13, wherein only the LEDs extend into the channel, and the means for coupling is coupled with the first surface on opposite sides of the LEDs.

15. The panel lighting system of claim 1, wherein the flexible heat conducting material is aluminum adhesively coupled to the rear planar surface of the circuit board to provide heat dissipation for the flexible circuit board.

16. The panel lighting system of claim 5, further comprising a bracket configured to fixedly maintain the coupler in the notch and fixedly coupled to one of the first planar surface and the second planar surface.

* * * * *